July 30, 1935.  T. ZIMMERMAN ET AL  2,009,644
METHOD OF FORMING ROLLER BEARING CUPS
Filed Jan. 27, 1933  4 Sheets-Sheet 1

INVENTORS
Thomas Zimmerman,
Albert Schrieber,
BY
ATTORNEYS

July 30, 1935. T. ZIMMERMAN ET AL 2,009,644
METHOD OF FORMING ROLLER BEARING CUPS
Filed Jan. 27, 1933   4 Sheets-Sheet 2
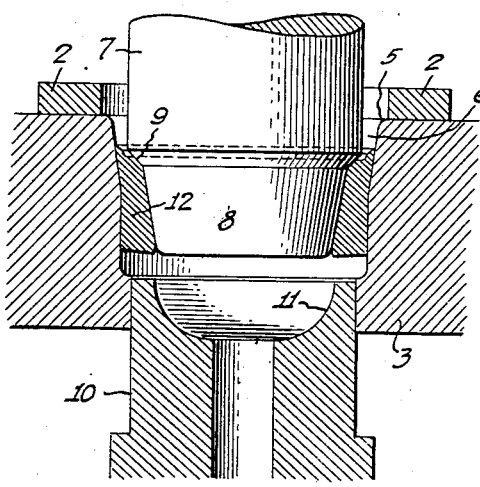
Fig. 6.
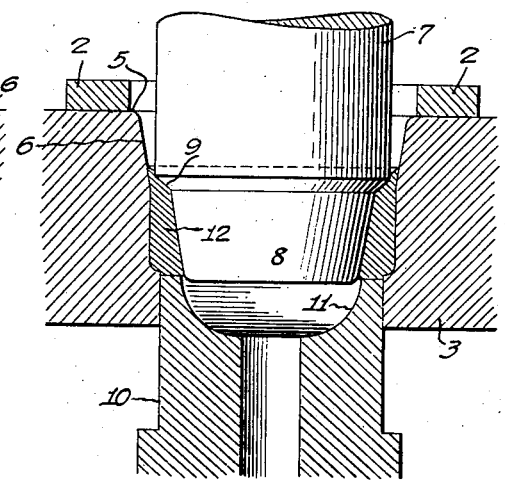
Fig. 7.
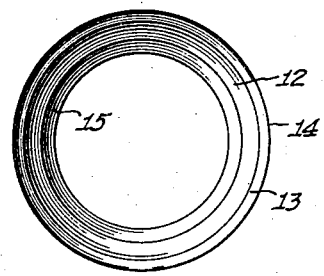
Fig. 8.
Fig. 9.
Fig. 10.
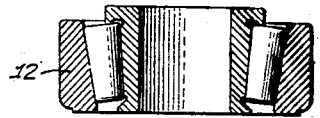
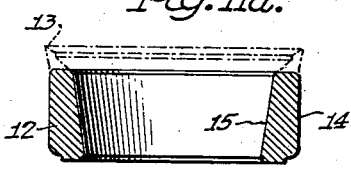
Fig. 11a.
Fig. 11.
INVENTORS
Thomas Zimmerman,
Albert Schrieber,
BY
ATTORNEYS July 30, 1935.  T. ZIMMERMAN ET AL  2,009,644
METHOD OF FORMING ROLLER BEARING CUPS
Filed Jan. 27, 1933  4 Sheets-Sheet 3

INVENTORS
Thomas Zimmerman,
Albert Schrieber,
BY
ATTORNEYS

July 30, 1935.  T. ZIMMERMAN ET AL  2,009,644
METHOD OF FORMING ROLLER BEARING CUPS
Filed Jan. 27, 1933  4 Sheets-Sheet 4

INVENTORS
Thomas Zimmerman,
Albert Schrieber,
BY
ATTORNEYS

Patented July 30, 1935

2,009,644

UNITED STATES PATENT OFFICE 2,009,644

METHOD OF FORMING ROLLER BEARING CUPS

Thomas Zimmerman and Albert Schrieber, Detroit, Mich., assignors to Bower Roller Bearing Co., Detroit, Mich., a corporation of Michigan Application January 27, 1933, Serial No. 653,871

7 Claims. (Cl. 29—148.4)

This invention relates to a new and novel process or method, especially adapted to the manufacture of cups for roller bearings and similar members, and an object of the invention is to effect a saving in time and material, and to produce a cup body of better texture due to the drawing and compacting of the metal during the forming operation.

A further object is to effect a further saving by eliminating the necessity for certain machining operations, the cup being formed by punch and die operations, into substantially the desired form and with very smooth, compact inner and outer surfaces, thereby securing a further saving of time in the grinding of these surfaces, and producing a cup having maximum wearing qualities and which is less liable to crack or develop flaws during the forming or other operations, waste due to such defects being thereby reduced to the minimum.

It is also an object, to effect a saving in blank material by giving the blank a particular form which may be readily stamped from sheet metal, and utilizing the central portion removed in forming one blank, to form a blank for a cup of a different dimension.

Other objects and advantages will become apparent by reference to the accompanying specification and drawings wherein—

Figs. 4, 5, 6 and 7 are sectional views similar to Fig. 3 and illustrating succeeding steps in the process;

Fig. 8 is a plan view of the cup as formed by the present process;

Fig. 9 is a transverse section of Fig. 8;

Fig. 10 is a bottom end elevation of Fig. 9;

Fig. 11 is a transverse section of a finished cup and illustrating in dotted lines, the portion removed therefrom a machining operation;

Fig. 11a is a transverse section of a roller bearing illustrative of an assembly embodying the finished cup;

To assist in pointing out the new features and advantages of the present method of forming roller bearing cups, an old and well known method is illustrated in Figs. 21 to 29 inclusive, wherein the blank A is in the form of a disk usually stamped from sheet metal and this blank is formed within a suitably shaped die block B, into cup form by means of a punch C, adapted to engage the central portion of the blank which is supported at its peripheral edge only upon the die block over the open upper end of the die chamber axially thereof, the bore or chamber B' of the die being tapered toward its lower end and at its upper end, being flared outwardly in an outer sweeping curve to form a curved annular shoulder $B^2$ at the periphery of the upper end of the bore B'.

A centering member D is secured upon the die block and is formed with an opening to receive the disk or blank A and hold it centered over the die chamber B', the sweep of the curved shoulder B² merging into the upper face of the block at the edge of the opening in the centering member D, so that when the blank is placed therein it will rest on the die block at its peripheral lower edge or corner only. When the punch C descends, the lower end portion of which is tapered to conform to the taper of the bore B', the blank will be depressed into the bore and formed up around the lower end of the punch with a simple cupping action, bottom E of the cup thus formed being forced by the end face of the punch, into firm contact with a removable plug F closing the lower end of the bore B' so that said bottom will be properly formed with the annular cup wall E' extending upwardly within the space between the wall of the bore and the correspondingly tapered end portion of the punch.

Figure 26:
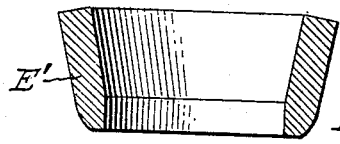
Fig. 26 is a sectional view of a cup formed in the dies illustrated in Figs. 24 and 25.

It is this wall E' which is to form the ring or annular roller bearing cup, and therefore the next step is to punch out this bottom E, which is done by a straight punch G, the plug F being removed so that the bottom of the cup may be punched out, leaving the annular wall E' in the outwardly and upwardly inclined position in which it is formed by the punch C. This annular member is then removed from the die, as shown in Fig. 26, and machined or turned off as indicated in dotted lines in Figs. 27 and 28 to give it the necessary shape, three such machining operations being required, one to cut away the exterior face or side so that this face will be parallel with the axis of the ring, as indicated at H, another to cut away the rim or what was originally the peripheral edge of the blank, as indicated at I, and a third operation to remove the lower end J of the wall E' from which the bottom E was severed, as indicated in dotted lines in Fig. 28.

Figure 29:
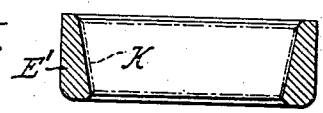
Fig. 29 is a sectional view of the finished cup formed by this old method and illustrating by dotted lines, the final internal boring and grinding operations.

It will be noted that in this old process there is a large amount of metal wasted, not only in the several machining operations, but the bottom E is also waste as it is not left in such condition after the cupping and punching operations that it can be used as a blank for a cup of lesser dimensions. Further, a blank A of comparatively large diameter is required due to the fact that in the cupping operation, the peripheral edge portion of the blank is drawn inwardly to form the annular wall E', and this drawing or inward folding action, disrupts the grain of the metal, often causing cracks and flaws in said wall which appear when the machining operations are performed, thus necessitating the discarding of the product and further increasing the amount of waste and loss of time. Further, it is well understood that in such cupping operation, due to the strain imposed where the cup bottom joins the side wall, and to the hardening of the metal particularly at this point, the metal is extremely liable to crack or tear. After the machining operations have been performed, a boring operation indicated by the dotted lines K in Fig. 29, is performed to give the desired internal diameter to the cup, and it is also usually necessary to grind this surface to make it perfectly smooth for the rolls shown in Fig. 11a to run thereon, and in some cases it may also be found necessary to grind the exterior of the cup wall.

Figure 1:
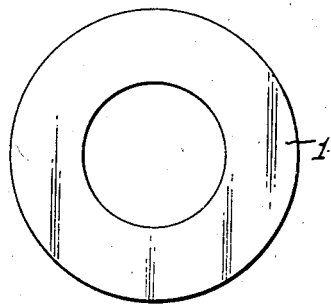
Figure 1 is a plan view of a blank suitable for use in connection with a process embodying the present invention.
Figure 2:
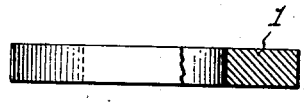
Fig. 2 is an edge view, partly broken away and in section, of the blank shown in Fig. 1.

In the present forming process as illustrated in Figs. 1 to 7, inclusive, the above pointed out losses and defects are overcome, in that, in the beginning, as illustrated in Figs. 1 and 2, a ring-form of blank I is employed, the external diameter of which is but slightly greater than the desired external diameter of the finished cup to be formed therefrom. This ring shaped blank is preferably struck from a sheet of metal, and, therefore, the disk of metal removed from the center of this ring-shaped blank, is left in such condition that it may be used to form a blank for a cup of lesser dimensions.

Figure 3:
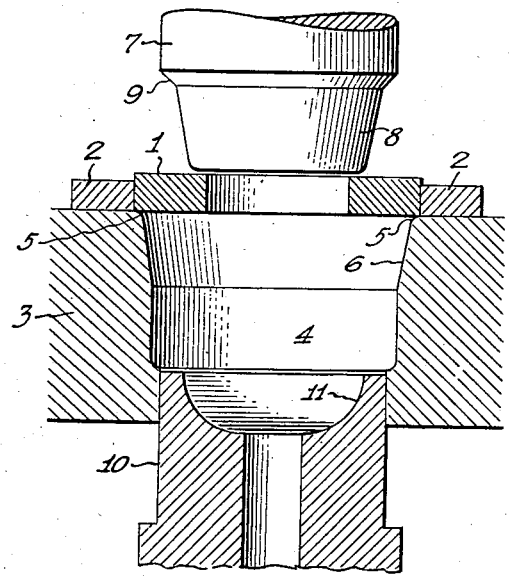
Fig. 3 is a sectional view of a die with the blank shown in section and in place thereon, together with a punch shown in elevation, to illustrate the present process or method and to show the position of the parts at the beginning of the forming operation.

As illustrated in Fig. 3, this ring-shaped blank I is placed within the centering member 2 secured upon the die block 3 to hold the blank centered axially with the bore or chamber 4 in the block and with the peripheral lower corner of the blank resting upon the block where the outwardly curved upper end or corner 5 of the downwardly and inwardly tapered upper end portion 6 of the bore, merges into the upper surface of the die block. The taper of the portion 6 of the bore is small, and, therefore the external diameter of the blank need be but little greater than the diameter of the straight lower end portion 4 of the bore which portion determines the outer diameter of the annular wall of the member formed in the die by the descent of the punch 7, this punch being formed with a downwardly and inwardly tapered lower end portion 8 conforming to the taper of the portion 6 of the bore and which portion 8 joins the body of the punch in a beveled or downwardly inclined shoulder 9, the diameter of the upper end of the portion 8 being considerably less than the diameter of the punch body above, and less than the diameter of the bore, leaving a space between punch and bore wall when the punch descends into the bore, which space is of a width transversely, equal to the desired thickness of the ring member to be formed within the die.

Figures 4, 5:
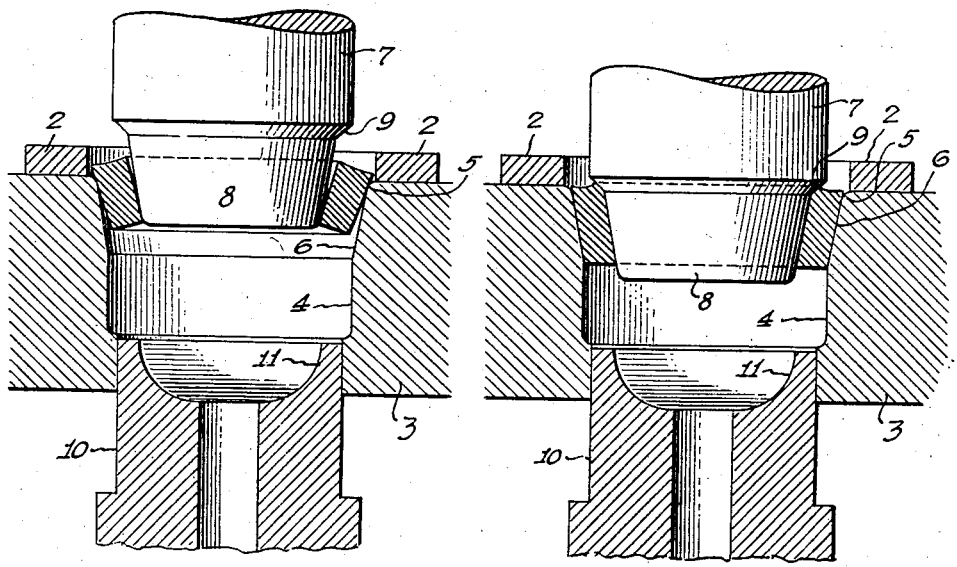

Descent of the punch 7, depresses the center portion of the blank, said blank turning upon the shoulder 5 as shown in Fig. 4, this step which might be designated as turning the ring blank inside out, being the first step of the forming operation. This operation but slightly decreases the external diameter of the blank, but does, in depressing the central portion of the blank, expand or stretch the metal from the central opening in the blank, outwardly, and as the punch continues downward, as shown in Fig. 5, the shoulder 9 on the punch comes into contact with the upper end edge of the ring thus formed, forcing it to move down with the punch into the straight part of the bore as shown in Fig. 6 and thus drawing and compacting the metal and elongating the ring in the direction of its longitudinal width. Further downward movement of the punch to the position shown in Fig. 7, further elongates the ring in width by a drawing action which takes all tension out of the metal and compacts it, putting it in the best possible condition for use in a roller bearing cup, eliminating flaws from the body or wall and all tendency to crack. The final downward movement of the punch illustrated in Fig. 7, forms the lower end edge of the ring to the desired form for use as a bearing cup, by forcing it against the formed lower end of the die bore and against the upper formed end edge of a plug 10 for closing the lower end of the bore, this plug being cupped or recessed as at 11 to permit the extreme lower end of the punch to project slightly beyond the formed ring after said ring has come to seat in the lower end of the bore and upon said plug.

This limited advance of the lower end of the punch through the formed ring member, which is indicated as a whole by the numeral 12 and is shown in detail in Figs. 8 to 10, advances the punch shoulder 9 in contact with the upper end edge of ring member and forces the excess metal to flow upwardly to a limited extent between said shoulder and punch body surfaces and the surface of the lower end of the tapered portion of the bore as shown in Fig. 7, forming an internally tapered annular flange 13 on the upper end edge of the annular wall 14 of the ring member.

The metal drawing operation or step of the process which takes place when the partly formed ring member is forced downward in the bore in contact with the tapered and straight portions of the bore, produces a very smooth external surface upon the wall 14, and the straight portion of the bore forms this external surface exactly parallel with the axis of the ring 12, which is the desired form for the finished cup. The tapered end portion 8 of the punch confines the metal between it and the wall of the bore, and the drawing action which takes place as the punch descends, causes the ring to accurately conform to the taper of this punch end, giving a very smooth compacted inner tapered ring surface 15 which closely conforms to the desired internal shape for the finished bearing cup. Little internal boring of the ring to bring it to the desired diameter, and usually no grinding of the external surface is therefore necessary, and these surfaces hold to substantially the exact desired diameters as the tendency of the ring to change its form by expansion or contraction after being removed from the die, is eliminated by the drawing and compacting of the metal during the forming operation.

The final steps in the process of making the cup are therefore, one machining operation to remove the flange 13, as indicated in Fig. 11, and an internal grinding operation to finish the surface engaged by the rolls in the bearing assembly shown in Fig. 11a. Waste of stock is therefore reduced to the minimum, particularly as the disk of stock removed from the center of the ring blank is left in such condition that a ring blank from which to form a cup of lesser dimensions, may be blanked, particularly a ring blank of the modified form shown in Figs. 12 and 13.

Figure 12:
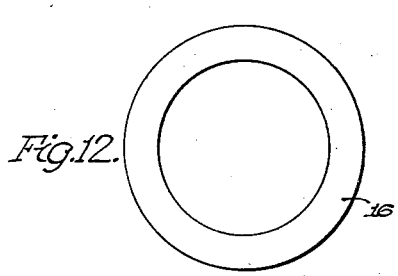
Figs. 12 and 13 are views similar to Figs. 1 and 2, of a blank of slightly modified form which may be employed in the present process.
Figure 13:
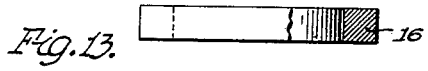
Figure 15:
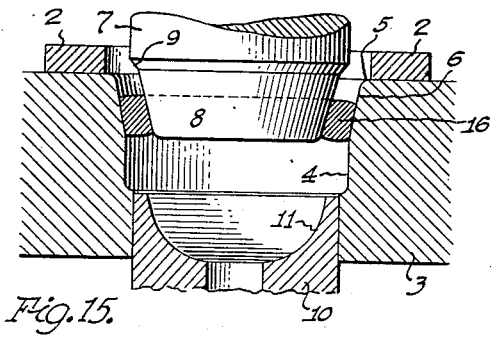

To form a bearing cup from the ring blank 16 shown in Figs. 12 and 13, the previously described method or process is modified somewhat in that the step indicated in Fig. 4 and described as the step of punching the ring blank to "turn it inside out", is eliminated, this step being unnecessary due to the fact that the body of the ring blank 16 is much less in horizontal or transverse width than that of the ring blank 1 and also that the depth or height of the bearing cup to be formed therefrom, is much less than that of the cup shown in Fig. 11. Outside of this difference, the process shown in Figs. 14 to 18 inclusive, is substantially the same as that shown in Figs. 3 to 7, inclusive.

Figure 14:
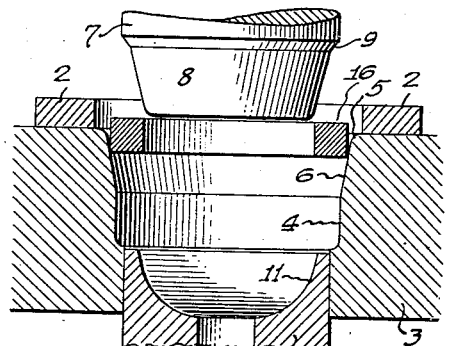
Figs. 14, 15, 16, 17 and 18 are sectional views of a die with a punch shown in elevation, illustrative of succeeding steps of the process of forming the blank shown in Figs. 12 and 13, into cup form.

As shown in Fig. 14, the ring blank 16 is first placed beneath the lower tapering end portion 8 of the punch 7 within the upper end of the tapered portion 6 of the bore of the die block 3, said blank being of lesser external diameter than the diameter of said upper end of said tapered bore so that said blank will engage at its lower peripheral corner, the tapering wall of the bore adjacent its upper end and thus be supported and centered in the bore.

Figure 18:
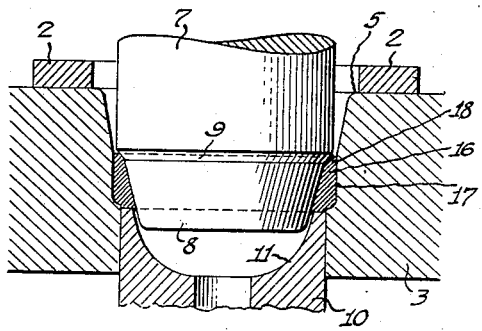
Figure 16:
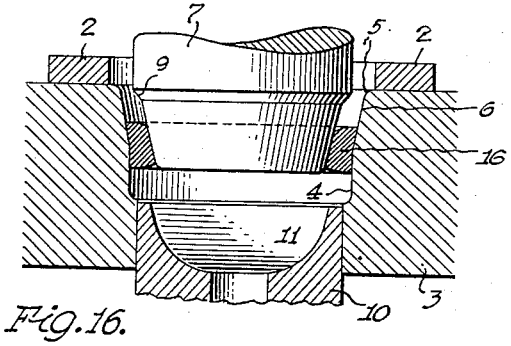
Figure 19:
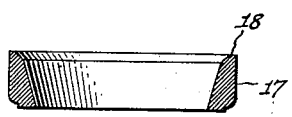
Fig. 19 is a transverse section of the cup formed by the preceding steps illustrated in Figs. 14 to 18 inclusive.
Figure 17:
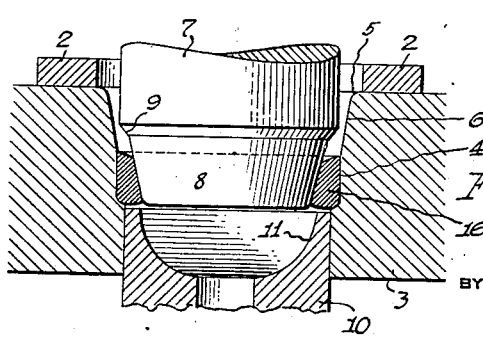
Figure 20:
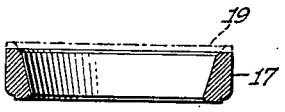
Fig. 20 is a transverse section of the finished cup, illustrating by dotted lines, the final machining operation.
Figure 21:
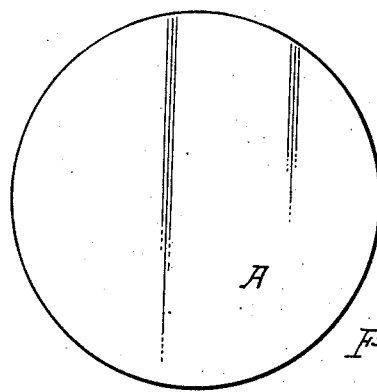
Figs. 21 and 22 illustrate, in plan view and edge elevation respectively, a blank commonly employed in forming cups according to the usual process.
Figure 22:
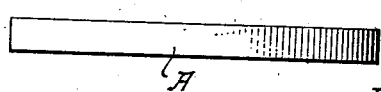
Figure 23:
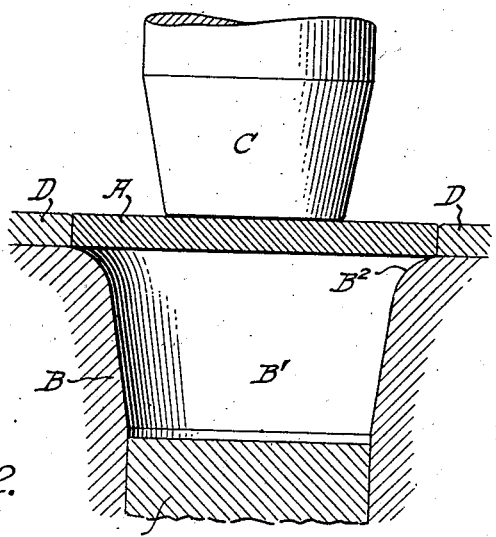
Fig. 23 is a sectional view of a die and a blank in place thereon, with a punch shown in elevation, all as constructed and arranged for carrying out the usual method of forming roller bearing cups.
Figure 24:
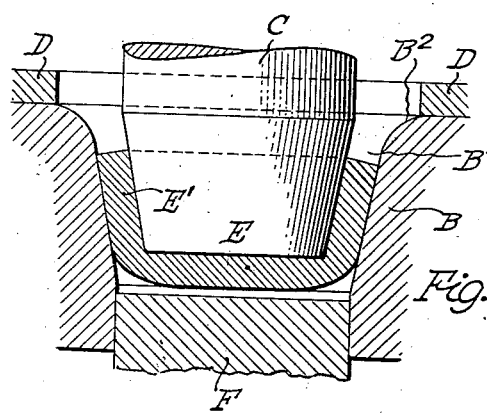
Figs. 24 and 25 are illustrative of succeeding steps in forming a cup in accordance with the usual or known practice.
Figure 27:
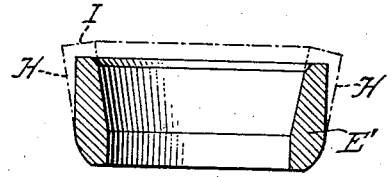
Figs. 27 and 28 are similar sections and illustrating by dotted lines, the final machining operations.
Figure 28:
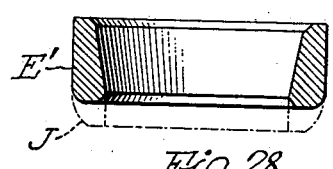
Figure 25:
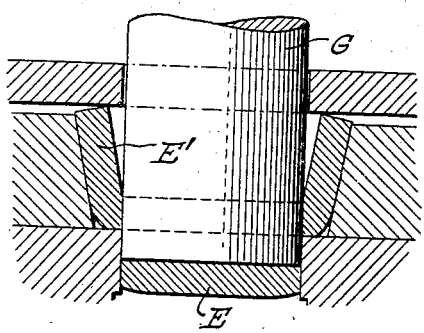

The lower end of the end portion 8 of the punch is of substantially the same diameter as the internal diameter of the ring blank, and, therefore upon descent of the punch, its lower end will enter the blank, centering and confining it between punch and inclined wall of the bore and forcing it downward within the bore with a compressing and drawing action as illustrated in Figs. 15 to 18 inclusive, the last end of this down movement of the punch or plunger, as shown in Fig. 18, seating the lower end of the wall 17 of the formed ring, at the bottom of the straight portion 4 of the bore and upon the annular end portion of the plug 10 surrounding the cup or recess 11 in said end of said plug, and thus accurately shaping this lower end of said wall 17 to the desired form, the punch continuing its down movement for a short distance after such seating, to project the lower end of the punch a short distance into said recess 11 and to bring its shoulder 9 into contact with the upper end edge of the wall 17 to confine said annular wall within the space between the straight portion of the wall of the bore and the tapered end portion 8 of the punch, thus drawing and compressing the metal and at the same time permitting the excess to flow up against the shoulder 9 between it and the bore wall. This limited annular flange 18 thus formed on the upper end edge of the wall 17 as shown in Fig 19, may, thereafter be removed by a machining operation as indicated at 19 in Fig. 20.

The ring blank 16 is thus formed within the die by a drawing and compressing action, into substantially the desired cup-form so that but a limited amount of machining or grinding is necessary to give it the desired dimensions and cross-sectional form, and the metal, during the several forming steps, is so changed in its texture that flaws or tendency to crack, split or disintegrate are eliminated, and very smooth, compact surfaces having long wearing qualities will be formed during the forming operations and of accurate dimensions which will not be materially changed by contraction or expansion of the metal after the forming operation is completed.

Obviously the configuration of the die bore and punch may be changed to produce cup rings of a different size and form from that shown, without departing from the present method or means or from the spirit of the present invention, such changes falling within the scope of the claims presented herewith, and which changes are contemplated.

What we claim is:—

1. The method of forming an annular roller bearing member, which method includes forming a ring shaped blank from sheet metal, and then forming this blank into the desired annular member form by first forming said blank between concentric inwardly and downwardly tapering conical surfaces during a downward movement of the blank to gradually decrease the outer diameter of the annular blank to a limited extent, and then further forming said blank by continuing the downward movement thereof with the blank confined between a cylindrical surface concentric with the axis of the blank and a downwardly and inwardly tapering conical surface, whereby the metal of the blank is drawn and compressed while so confined to change its texture and the formed member is provided with an outer cylindrical surface of extended width in the direction of the axis of said member and with an inner conical surface.

2. The method of forming an annular cup for a roller bearing, which method includes stamping an annular blank from a sheet of metal, placing said blank over the upper open end of a die bore having an inwardly and downwardly tapering conical upper end portion and a cylindrical closed lower end portion, and then forcing said blank downwardly into said bore by means having a conical end portion to conform to the taper of the conical end of said bore, and form said blank around the conical end of said means and increase the width of the annular blank in the direction of its axis, and to thereafter force the partly formed blank into external cylindrical form and into internal conical form within the cylindrical portion of said bore with a drawing and compressing action upon the metal and to form the lower end of the blank into the desired contour at the lower end of said bore while permitting the excess metal of the blank to flow upwardly between the lower end portion of the tapered bore surface and said conical end portion of said member.

3. The method of forming an annular cup for a roller bearing, which method includes forming an annular blank the width of the ring portion of which is greater than the thickness thereof, placing this blank upon a die block and concentric with a bore in the block, which bore is formed with an upwardly and outwardly tapered conical end portion and a lower cylindrical end portion joining the lower end of said conical portion and having a closed and formed lower end, forcing said blank downward into said conical portion of said bore by bringing the lower end of a member having a conical lower end portion into contact with the central portion of said blank and an annular shoulder to engage the upper end of said blank and around which conical end portion said blank is formed between it and said conical portion of said bore to decrease the external diameter of the blank; forcing the blank thus partially formed, downwardly into the cylindrical portion of said bore by said member to compact and draw the metal and form it with an outer cylindrical surface and an inner conical surface and to form its lower end into the desired cup form by bringing it into contact with the formed and closed end of the bore and to flow the surplus metal upwardly between said annular shoulder and lower end portion of said conical bore and form a flange upon the upper end of the formed member; and then removing the member from the die and removing said flange by a machining operation to give to said end the desired finished form.

4. The method of forming an annular internally tapered roller bearing member, which method includes providing an annular blank, and then by a single continuous movement of a punch within a die, reducing the external diameter of said blank while limiting its internal construction, and increasing the width of said blank in the direction of its axis and simultaneously forming the blank with an external cylindrical surface and an internal conical surface with a drawing and compressing action upon the metal.

5. The method of forming an annular internally tapered roller bearing member, which method includes providing an annular blank, and thereby one continuous downward movement of a punch within a die, reducing the external diameter of said blank by a gradual inward compression while limiting its internal contraction, increasing the width of said blank in the direction of its axis and simultaneously forming the blank with an external cylindrical surface and an internal conical surface by drawing and compressing the metal, and forming within the die, a lower end surface of the blank to final member form at the end of said last named forming operation.

6. The method of forming an annular roller bearing member, which method comprises providing an annular blank, reducing the external diameter of the blank gradually while limiting its internal contraction, increasing the width of the blank in the direction of its axis and simultaneously forming the blank with an external cylindrical surface and an internal conical surface, the metal being drawn and compressed during such formation and then forming one end of the blank into final member form at the end of the last named forming operation and forming an annular flange at the opposite end of said blank by permitting a limited flow of the excess metal, and then removing said flange.

7. The method of forming an annular roller bearing member, which method includes providing an annular blank, reducing the external diameter of the blank gradually within a die while limiting its internal contraction by a punch, increasing the width of the blank in the direction of its axis and simultaneously forming the blank with an external cylindrical surface and an internal conical surface, by a drawing and compressing of the metal by the action of the punch within the die during such formation, and then forming an end surface of the blank into final member form by a formed end of the die and at the end of the last named forming operation, and forming an annular flange at the opposite end of said blank by extrusion of excess metal between die and punch.

THOMAS ZIMMERMAN.
ALBERT SCHRIEBER.